ARITHMETIC UNIT FOR DIGITAL COMPUTERS

Filed Dec. 13, 1965 2 Sheets-Sheet 1

INVENTOR.
MARVIN C. STEWART
BY
H P Terry
ATTORNEY

ARITHMETIC UNIT FOR DIGITAL COMPUTERS

Filed Dec. 13, 1965

2 Sheets-Sheet 2

INVENTOR.
MARVIN C. STEWART
BY
H.P. Terry
ATTORNEY

United States Patent Office 3,395,271

Patented July 30, 1968

3,395,271

ARITHMETIC UNIT FOR DIGITAL COMPUTERS

Marvin C. Stewart, Hempstead, N.Y., assignor to Sperry Rand Corporation, a corporation of Delaware Filed Dec. 13, 1965, Ser. No. 513,436
12 Claims. (Cl. 235—173)

ABSTRACT OF THE DISCLOSURE

A serial-parallel arithmetic unit for digital computers utilizing M-generating means and operating upon signals in bit pairs that includes gating means responsive to gating signals for selectively interconnecting operand and operator storage means, full adding means, and shift register means for selectively performing multiplication and addition operations utilizing substantially fewer components than would normally be required for performing these functions.

Figure 1:
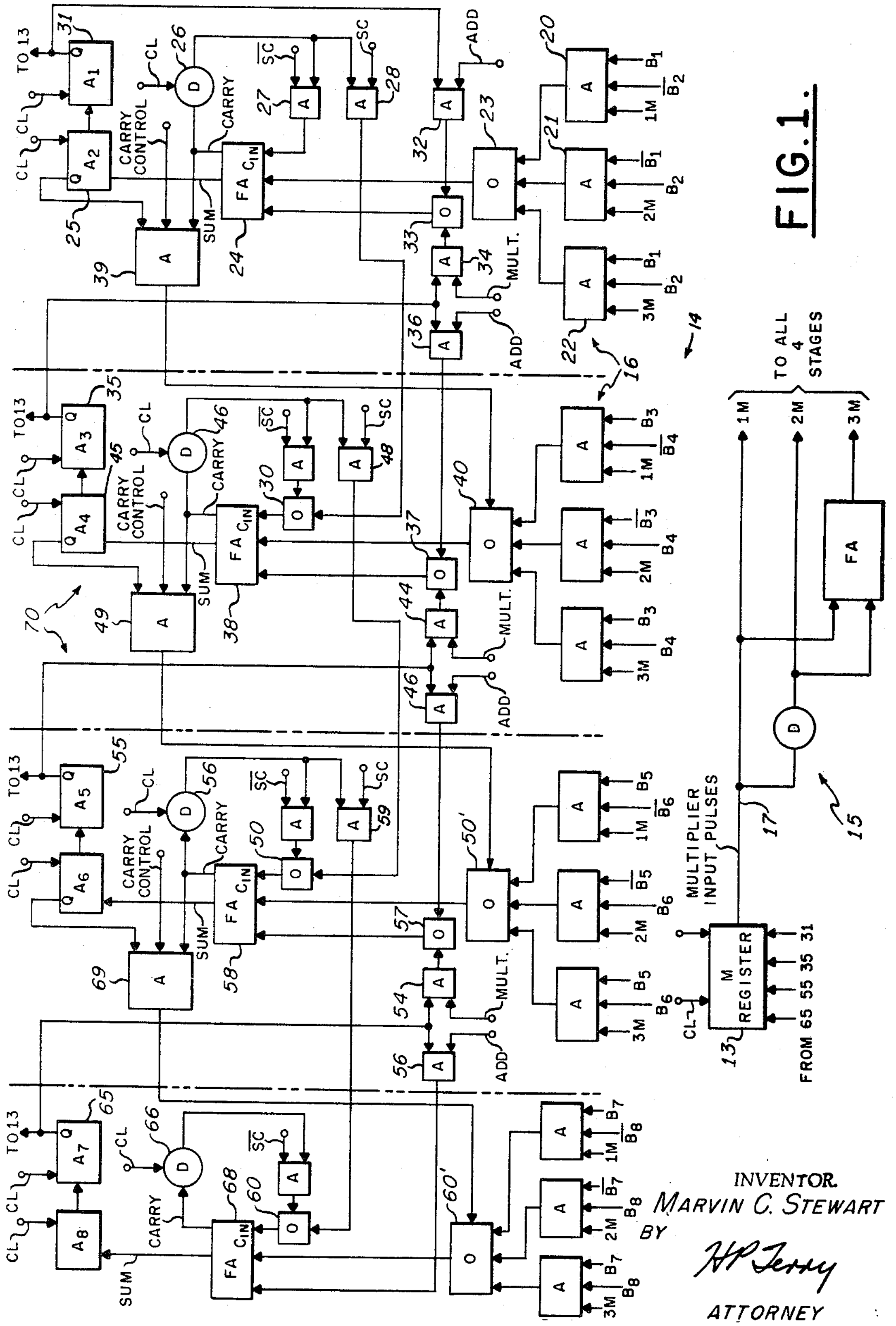

The present invention relates to arithmetic units for use in digital computers and more particularly concerns circuits therein capable of multiplication, addition, subtraction, accumulation, and/or shifting.

In one aspect of the present invention, it is an improvement over the M-generator type of serial-parallel multiplication arrangement shown on p. 157, FIGS. 5–11 in Arithmetic Operations in Digital Computers by R. K. Richards, published by D. Van Nostrand Company, Inc. The present invention achieves a significant increase in the speed of the multiplication operation over the aforementioned arrangement disclosed in said Richards' text, and in addition provides for addition, subtraction, accumulation and shifting by means of substantially fewer components than would normally be required.

It is therefore a primary object of the present invention to provide an arithmetic unit that provides a multiplication operation in significantly less time than comparable prior art devices.

It is a further object of the present invention to provide an arithmetic unit requiring less equipment than comparable prior art devices while simultaneously increasing the speed of at least one operation thereof.

It is an additional object of the present invention to provide an addition circuit having one full adder for each pair of bits in the operand.

The present invention accomplishes addition by applying the contents of an accumulator and the contents of a storage device as inputs to addition circuits. The outputs of the addition circuits are routed to the accumulator so that the resultant sum appears therein. When a multiplication instruction is performed, the number in the storage device is the multiplicand and the contents of the accumulator are transferred into an M-register and used as the multiplier in conjunction with an M-generator circuit. The multiplicand is successively added to the accumulator contents and shifted in accordance with the operation of the M-generator. Upon completion of the operation, the product is left in the accumulator.

It should be noted that only half as many addition circuits are needed with the present invention in contrast with an approach using one adder per bit. This significant equipment saving is accomplished by handling bits in pairs. Bits 1 and 2, 3 and 4, etc., are the pairs. Addition is accomplished in two steps, first adding the odd bits of the addend and augend, and then the even bits.

As a consequence of this two step process, it is possible to have all odd bits and then all even bits of the accumulator as output signals. The number of parallel transfer circuits between the accumulator and the M-register is therefore reduced by one-half. The transfer circuits first transfer any odd bits and then are used to transfer any even bits. The M-register is shifted during this process so that the bits are properly positioned.

Figure 2:
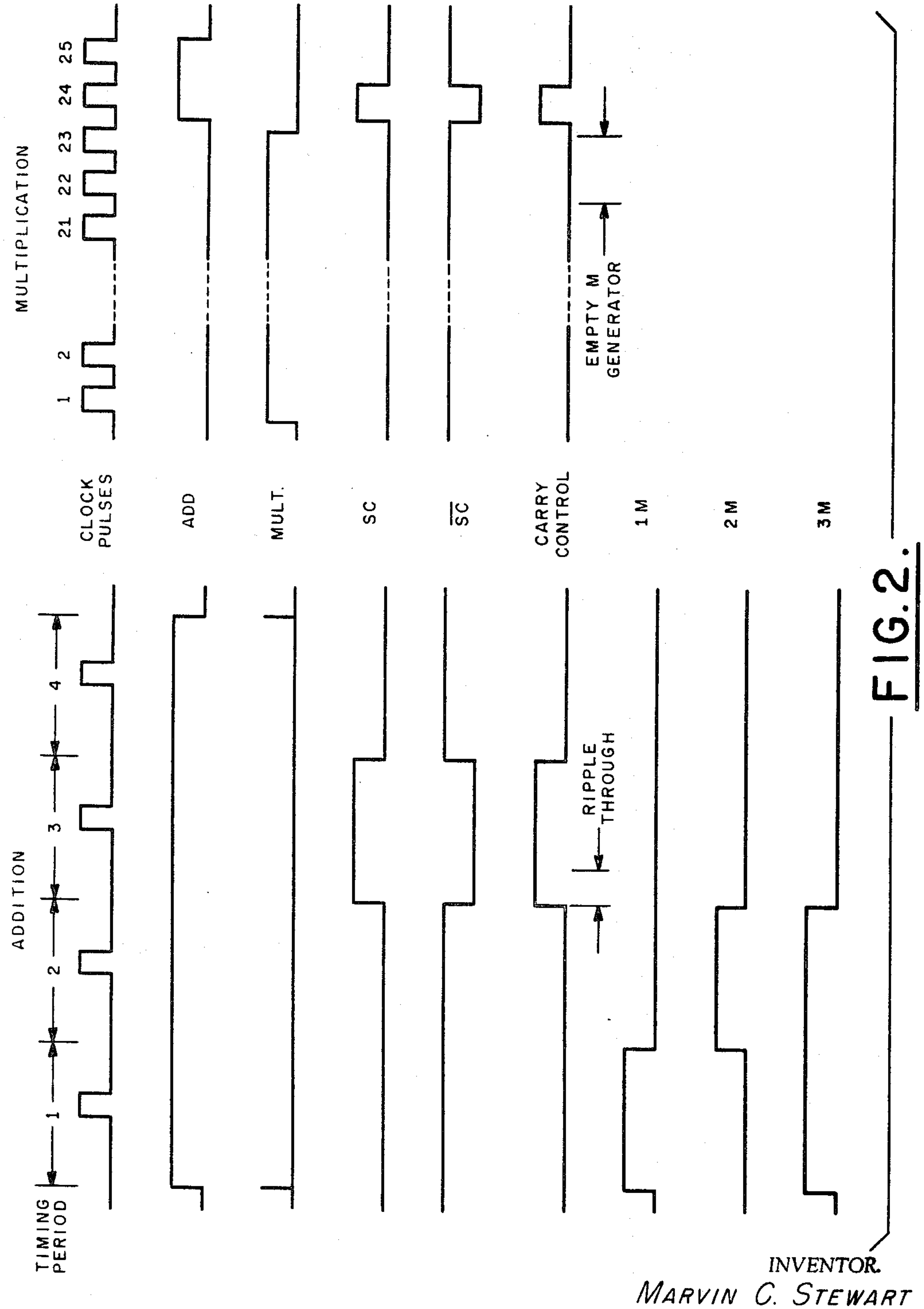

These and other objects and advantages will become apparent by referring to the drawings in which:

FIG. 1 shows an electrical schematic wiring diagram in block form of an arithmetic unit incorporating the present invention; and FIG. 2 shows typical waveforms utilized in operating the arithmetic unit of FIG. 1.

In an M-generator type arithmetic unit 14 as shown in FIG. 1, the result of a multiplication operation using only one full adder designated as FA for each pair of bits of information will now be explained for any combination of two bits. It will be appreciated that any pair of bits can only have one of the following combinations, 00, 01, 10 or 11. If the pair of bits is 00, then the resultant product is 0. The pair of bits will be considered the multiplicand while the other number will be considered to be the multiplier which is provided by an M-register 13 to an M-generator 15 in a manner to be more fully explained. If the pair of bits, i.e., the multiplicand, is 01; the resultant product is equal to the multiplier, i.e., is equal to M where M equals the multiplier. If the pair of bits is 10, the resultant product equals 2M, i.e., M shifted one bit position to the left. In the last case, if the pair of bits is 11, the resultant product is then 2M+M which is equal to 3M. Thus, the bit pair product can be combined and organized as shown in FIG. 1, where M, 2M and 3M are generated in an M-generator 15 and are applied as gating signals to the AND gates designated A in each stage of a decoder 16 of the arithmetic unit 14 in a manner to be more fully explained.

An arithmetic unit 14 is shown in FIG. 1 having four stages defined by vertical dot-dash lines wherein the structure in each of the four stages is substantially identical with respect to each other. Therefore only one stage will be explained in detail.

In the first stage, the M, 2M and 3M signals are connected to respective input terminals of AND gates 20, 21 and 22, respectively of the decoder 16. Since the resultant product of the bit pair 00 is 0, no AND gate is required for this bit pair. Therefore, the remaining bit pairs 01, 10, and 11 are designated as $\overline{B}_2$ and $B_1$, $B_2$ and $\overline{B}_1$, and $B_2$ and $B_1$, respectively, and they are applied to respective input terminals of the AND gates 20, 21 and 22, respectively from a storage device (not shown). The output terminals of the AND gates 20, 21 and 22 are connected through an OR gate 23 to an input terminal of a full adder (FA) 24. The sum output terminal of the full adder 24 is connected to an input terminal of a shift register ($A_2$) 25. The carry output terminal of the full adder 24 is connected through a delay circuit 26 which provides approximately one bit delay time. The output of the delay 26 is connected to respective input terminals of AND gates 27 and 28. A shift carry "not" signal designated $\overline{SC}$ is also connected to an input terminal of the AND gate 27 which has its output connected to a carry input terminal of the full adder 24. A shift carry signal designated SC is connected to an input terminal of the AND gate 28 which has its output connected to an input terminal of an OR gate 30 in the succeeding stage, for reasons to be explained. An output terminal of the shift register ($A_2$) 25 is connected to an input terminal of a shift register ($A_1$) 31 which has an output terminal connected to an input terminal of an AND gate 32 that in turn is connected through an OR gate 33 to an input terminal of the full adder 24. The AND gate 32 is responsive to an addition signal (shown in FIG. 2) from an addition signal source indicated by the legend ADD. The shift registers 25 and 31 as well as the delay circuit 26 are responsive to clock pulses from a clock pulse source designated by the legend CL.

An AND gate 34 is responsive to the output signal from a shift register ($A_3$) 35 in an adjacent stage and to a multiplication signal (shown in FIG. 2) from a multiplication signal source indicated by the legend MULT. The output terminal of the AND gate 34 is connected to an input terminal of the OR gate 33. The output signal from the shift register ($A_3$) 35 in the adjacent stage is also connected through an AND gate 36 to an OR gate 37 which in turn is connected to an input terminal of a full adder 38 in the same adjacent stage. The AND gate 36 is also responsive to an addition pulse for gating purposes.

The carry signal from the full adder 24 is also connected to an input terminal of an AND gate 39 which has its output terminal connected to an OR gate 40 in the adjacent stage that has its output terminal connected to an input terminal of the full adder 38. An output terminal of the shift register 25 is also connected to an input terminal of the AND gate 39. A carry control signal from a carry control signal source indicated by the legend carry control is also connected to an input terminal of the AND gate 39.

In operation generally, a full adder such as FA 24 is used to add two pairs of bits, for example, let A and B represent the numbers to be added where $A = \ldots, A_{n+1}, A_n$ and $B = \ldots, B_{n+1}, B_n$. First, the $A_n$ and $B_n$ bits are applied to the addition circuit to be added followed by the $A_{n+1}$ and $B_{n+1}$ bit pair. The A bits are applied to the full adder 24 in serial by the action of the shift registers 25 and 31. The pair of B bits is applied to the full adder 24 in serial by means of the M-generator 15. The application of a single pulse at the M input circuit 15, for example, by inserting a one bit into the least significant stage of the M-register 13, produces $B_n$ and $B_{n+1}$ in serial form at the output of the OR gate 23 regardless of the value of $B_n$ and $B_{n+1}$.

In accordance with the operation of the present invention for multiplication, the contents of the A shift register stages $A_1$ through $A_8$ which collectively define an accumulator 70, are transferred to the M register 13 by means of connections from the output terminals of the odd numbered stages to provide the multiplier in a manner to be more fully explained. The M-register 13 may be a conventional shift register, for example, while the A shift register stages may comprise J–K flip-flops. The application of the multiplier from the M-register 13 in the form of M input pulses serially to the M input terminal 17 of the M-generator 15 provides $B_n$ and $B_{n+1}$ outputs at the proper time and sequence for continuous and successive additions and shifting necessary for multiplication. For multiplication, the circuit is arranged to add and shift at the same time. Hence, a multiplication signal shown in FIG. 2 gates the multiplication AND gates 34, 44 and 54 to provide a configuration for adding and shifting the output of the shift registers 35, 55 and 65 through the full adders 24, 38, and 58 of the respective adjacent stages and into the next respective lower order A stage. For addition it is not necessary to shift and therefore the addition AND gates 32, 36, 46 and 56 are gated by the ADD addition signal shown in FIG. 2 to provide a configuration in which the output of the shift registers 31, 35, 55 and 65 are gated into the full adders 24, 38, 58 and 68, respectively. Hence, each stage includes gating means to determine whether the associated full adder FA accepts inputs from the shift register holding the signal $A_{n+1}$ or the signal $A_{n-1}$. The delay circuits 26, 46, 56 and 66 are used to delay any carries generated by an addition until the next addition, i.e., by one bit time. Preferably, the carry signal is delayed slightly more than a bit time to be assured that the carry signal overlaps the addition operation.

In operation, addition is accomplished utilizing the add configuration in which the addition AND gates 32, 36, 46 and 56 are gated by the ADD addition signal shown in FIG. 2 in order that the output of the shift registers 31, 35, 55 and 65 are gated into their respective full adders 24, 38, 58 and 68 through respective OR gates 33, 37 and 57, and directly respectively. Originally the first and second stages, for example, are as shown with a $B_1$ signal applied through the OR gate 23 to the full adder 24 and with a $B_3$ signal applied through the OR gate 40 to the full adder 38 and the shift registers 31, 25, 35 and 45 contain signals representing $A_1$, $A_2$, $A_3$ and $A_4$, respectively. After one clock pulse, the first and second stages are then in a configuration in which the $B_2$ signal is applied through the OR gate 23 to the full adder 24 while the $B_4$ signal is applied through the OR gate 40 to the full adder 38. The shift register 31 now contains the $A_2$ signal while the shift register 25 contains the $A_1+B_1$ signal and the shift register 35 contains the $A_4$ signal while the shift register 45 contains the $A_3+B_3$ signal. After the next clock pulse the shift register 31 contains the $A_1+B_1$ signal while the shift register 25 contains the $A_2+B_2+C_1$ signal where $C_1$ is the carry resulting from the addition of $A_1$ and $B_1$. The shift register 35 contains the $A_3+B_3$ signal while the shift register 45 contains the $A_4+B_4+C_3$ signal where $C_3$ is the carry resulting from the addition of $A_3$ and $B_3$.

At this point the addition is complete unless some carries have been generated during the second addition in which event the carries must now be added to the next higher stages. To accomplish this, a shift carry signal (shown in FIG. 2) is applied to the AND gates 28, 48 and 59 immediately following the second addition. This signal gates any remaining carries to the next higher full adder stage. At the same time, the $\overline{SC}$ (shift carry not) signal inhibits the carries from re-entering OR gates 29, 30, 50 and 60, to prevent erroneous carries. Having once shifted the carries, the next addition takes care of all remaining carries, i.e., the carries ripple down. This is accomplished by utiizing the OR gates 40, 50′ and 60′. Since the B inputs were added prior to shifting the carries, these inputs via the OR gates 40, 50′ and 60′ are now empty. Thus, if the output of the full adder 24 yields a carry there will be an overflow if $A_2=1$. Just before and during the next addition, i.e., the third addition pulse, this overflow condition is tested by means of the AND gates 39, 49 and 69 and if there are carries from the respective full adders and shift registers at the time of the carry control pulse (the latter being shown in FIG. 2), the carry is applied to the usual B input through the respective OR gate of the next higher full adder, i.e., the outputs of the AND gates 39, 49 and 69, are applied to the OR gates 40, 50′ and 60′, respectively.

The next higher full adder is therefore preparing to make the addition $A_3+C_3+C_1$. If there is a carry resulting from the addition, there will be an overflow if $A_4=1$ and in this event, a one will be fed into the unused B input of the next higher full adder and so on through the succeeding stages. Once this rippling down of carry conditions is completed, the next (third) add pulse clocks the sum into the shift registers by means of the carry control signal shown in FIG. 2. The fourth and final add pulse adds any remaining information without loss of information due to overflow.

Thus to recapitulate, addition takes place in four clock pulses as follows:

Clock pulses 1 and 2—bits $A_{n-1}$, $A_n$ are added to the $B_{n-1}$, $B_n$ bits.

Clock pulse 3—all remaining carries are shifted to the next higher full adder and carry overflow conditions for each full adder are sampled and applied to the unused B input of the next higher full adder. The result is clocked into the shift registers.

Clock pulse 4—this clock pulse completes the addition.

The multiplication operation is performed by first transferring the contents of the accumulator 70 into the M-register 13 to be used as the multiplier M. The transfer is accomplished via connections from the odd accumulator stages $A_1$, $A_3$, $A_5$, $A_7$, to the even stages of the M-register 13. The M-register 13 is cleared of any bits prior to transfer. The steps in the transfer are as follows.

First the odd accumulator bits are transferred to the M-register 13 as the connection described above permits. Then, both the accumulator 70 and the M-register 13 are shifted one bit position by means of one clock pulse. This places all accumulator odd bits transferred to, and located in the even stages of the M-register 13 into the odd stages of the M-register 13. In addition, the contents of all even accumulator stages are transferred to the odd accumulator stages. Immediately following this shift, a second transfer is executed which places the event accumulator bits into the even stages of the M-register 13. The transfer is completed and the accumulator 70 is cleared by the application of a clear signal (not shown) to all accumulator stages in preparation for the process of multiplication. The transfer operation described immediately above requires two timing periods not shown in FIG. 2, which precede the actual multiplication process.

The multiplication process itself is now performed by adding and shifting with the multiplication signal (shown in FIG. 2) gating the multiplication AND gates 34, 44 and 54 to provide a multiply configuration for adding and shifting the output of the shift registers 35, 55 and 65 into the full adders 24, 38 and 58 of the respective adjacent stages, and with the multiplier being applied serially to the input of the M-generator 15 to supply the proper 1M, 2M and 3M signals. The M-register 13 and the accumulator 70 are shifted both at the same time by means of clock pulses. Between shifts, the M-generator 15 provides proper 1M, 2M and 3M signals corresponding to the new value applied to its input, and the full adders develop the next value to be shifted into the even accumulator stages to which they are connected. In response to the shift pulse, the values in the even accumulator stages $A_2$, $A_4$, $A_6$, $A_8$ are shifted into the odd accumulator stages $A_1$, $A_3$, $A_5$, $A_7$, the output or sum values generated by the full adders prior to the shift, are shifted into the even stages of the accumulator $A_2$, $A_4$, $A_6$, $A_8$ and the M-register 13 is shifted one position to the left. Also, the full adders and the M-generator 15 begin to develop new ouputs in preparation for the next shift. This process is repeated in an identical manner throughout the period of successive additions. Once the successive additions have been completed, which is when the multiplier has fully passed through M-generator, the full adder circuits 24, 38, 58 and 68 are changed from the multiply to the add configuration explained above by means of an ADD addition signal (shown in FIG. 2) being applied to the addition AND gates 32, 36, 46 and 56 and all carriers resulting from multiplication are absorbed in two clock pulse times by utilizing the carry and shift carry controls as described in the aforementioned addition process. Hence, multiplication can be defined as a one word time process.

The principal advantages offered by the adder-multiplier described herein are (a) fast multiply and (b) equipment savings. With respect to (a), conventional adder-multiplier circuits consist of a full adder circuit in each stage plus the ability to shift the register (usually the accumulator) to which the adders are connected. Under this configuration, multiplication is performed by successively adding and shifting. Since every addition must be followed by a shift, and since there are as many additions as bits in the multiplier M, a multipy operation requires 2M bit time in addition to whatever set-up time is required. Even the serial-parallel techniques which use fewer adders (e.g. Richards FIGS. 5–11), require the same 2M bit times. Further, these serial-parallel circuits cannot generally be used for a simple addition. Multiplication by the present invention is accomplished within $M+2$ bit times thereby significantly increasing the speed. Also, a simple addition may be performed using the same basic circuitry.

With respect to (b), a typical full adder may have $n$ gates. However, the cost of permitting a shift operation costs an additional number of gates. The present invention saves approximately one full adder less the additional gates required per stage for normal computer applications.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a serial-parallel arithmetic unit for digital computers utiliizng M-generating means,
(a) operand signal storage means for providing signals representative of an operand in terms of bit pairs,
(b) operator signal storage means for providing signals representative of an operator,
(c) said M-generating means being connected to receive said operator signals for providing M signals representative of selected multiples of said operator,
(d) decoding means coupled to receive said bit pairs defining said operand and to said M signals,
(e) full adding means selectively coupled to receive said operand and to said operator,
(f) shift register means coupled to said full adding means for providing a resultant,
(g) gating signal generating means for providing gating signals,
(h) and means including gating means connected to receive said gating signals for selectively interconnecting said operand and operator storage means, said full adding means, and said shift register means for selectively performing addition and multiplication operations.

2. In an arithmetic unit of the character described in claim 1 in which said means including gating means includes carry control, shift carry and add-multiply gates for selectively performing multiplication, addition, subtraction, accumulation and shifting.

3. In an arithmetic unit of the character described in claim 1 in which said gating means includes
(a) multiplication signal generating means for providing multiply signals,
(b) and multiplication gating means coupled to receive said multiply signals for gating the output of said shift register means to said full adding means of the adjacent stage.

4. In an arithmetic unit of the character described in claim 1 in which said gating means includes
(a) multiplication signal generating means for providing multiply signals,
(b) addition signal generating means for providing addition signals,
(c) multiplication gating means coupled to receive said multiply signals for gating the output of said shift register means to said full adding means of the adjacent stage,
(d) and addition gating means coupled to receive said addition signals for gating the output of said shift register means to said full adding means of the other adjacent stage whereby multiplication requires only two bit time in excess of said operator.

5. In an arithmetic unit of the character described in claim 4 in which
(a) said decoding means includes a plurality of AND gates each coupled to receive one of said bit pairs and one of said M signals,
(b) said AND gates of each stage being connected through an OR gate to said full adding means for that stage, (c) and said carry signal from an adjacent stage being applied to said OR gate.

6. In an arithmetic unit of the character described in claim 1 and further including carry shifting means for shifting carries to the adjacent full adding means.

7. In an arithmetic unit of the character described in claim 1 and further including carry control means coupled to receive signals from said full adding means and shift register means for enabling carry signals to ripple down through adjacent stages.

8. In an arithmetic unit of the character described in claim 7 in which at least a portion of said carry signals ripple down through said decoding means.

9. In a multiplier for digital computers having a plurality of stages, (a) multiplicand storage means for storing signals representative of a multiplicand, (b) multiplier storage means for storing signals representative of a multiplier, (c) M-generating means coupled to receive said multiplier signals for generating signals representative of said multiplier and selected multiples thereof, (d) bit pair decoding means coupled to receive bit pairs representing said multiplicand and to said multiplier and said selected multiples thereof for providing respective products thereof, (e) shift register means having a plurality of stages for storing partial products, (f) full adding means connected between said decoding means and said shift register means and coupled to receive said products and said partial products of an adjacent stage for providing the summation thereof to said shift register means, (g) and means including gating means for selectively interconnecting adjacent stages whereby multiplication is performed in two bit time in excess of the bit time of said multiplier.

10. In a multiplier of the character recited in claim 9 including carry shifting means for shifting carries to the next higher order full adding means.

11. In a multiplier of the character recited in claim 12 including carry control means coupled to receive signals from said full adding means and said shift register means for selectively enabling carry signals to ripple down through adjacent stages.

12. In a serial-parallel adder for digital computers, (a) addend storage means for storing signals representative of an addend, (b) bit pair decoding means coupled to receive bit pairs representing said addend for providing said bit pairs serially in order of increasing significance, (c) shift register means for storing signals representative of an augend, (d) full adding means connected between said bit pair decoding means and said shift register means for receiving said bit pairs and said augend signals for providing the summation thereof to said shift register means, (e) carry shifting means for shifting carries to the next higher order full adding means, (f) and carry control means coupled to receive signals from said full adding means and said shift register means for selectively enabling carry signals to ripple down through adjacent stages.

References Cited

UNITED STATES PATENTS

| | | | |
|---|---|---|---|
| 3,115,574 | 12/1963 | Paul et al. | 235—164 |
| 3,159,739 | 12/1964 | Deerfield | 235—164 |
| 3,192,363 | 6/1965 | MacSorley | 235—175 XR |

MALCOLM A. MORRISON, *Primary Examiner.*

V. SIBER, *Assistant Examiner.*